United States Patent [19]
Caine

[11] Patent Number: 5,667,256
[45] Date of Patent: Sep. 16, 1997

[54] GRAY WATER LINE ADAPTOR

[75] Inventor: Donald R. Caine, Greensboro, N.C.

[73] Assignee: Camco Manufacturing, Inc., Greensboro, N.C.

[21] Appl. No.: 431,968

[22] Filed: May 1, 1995

[51] Int. Cl.$^6$ ............................................. F16L 25/00
[52] U.S. Cl. .................... 285/148.23; 285/423; 285/12
[58] Field of Search ............................. 285/8, 12, 179, 285/177, 423; 137/899; 4/255.01–255.07; 134/167 C

[56] References Cited

U.S. PATENT DOCUMENTS

| | | | |
|---|---|---|---|
| 290,045 | 12/1883 | Hardy | 285/177 |
| 850,706 | 4/1907 | Withers | 285/179 |
| 1,988,198 | 1/1935 | German | 134/167 C X |
| 2,183,614 | 12/1939 | Henry | 285/177 X |
| 2,436,634 | 2/1948 | Davis | 285/8 X |
| 2,470,940 | 5/1949 | Mosher | 285/177 X |
| 3,808,611 | 5/1974 | Neuman | 4/255.01 |
| 3,936,892 | 2/1976 | Miller | 4/255.01 |
| 4,054,149 | 10/1977 | Nelson | 134/167 C |
| 4,133,347 | 1/1979 | Mercer | 137/899 X |
| 4,722,556 | 2/1988 | Todd | 285/179 X |
| 4,844,121 | 7/1989 | Duke | 137/899 X |
| 5,031,755 | 7/1991 | Blakeley | 285/179 X |
| 5,141,017 | 8/1992 | Trottier | 137/899 X |
| 5,201,553 | 4/1993 | Grisham | 285/177 |

FOREIGN PATENT DOCUMENTS

| | | | |
|---|---|---|---|
| 33324 | 9/1928 | France | 285/8 |
| 209819 | 1/1924 | United Kingdom | 285/8 |
| 580712 | 9/1946 | United Kingdom | 285/179 |

*Primary Examiner*—Dave W. Arola

[57] ABSTRACT

A gray water line adaptor formed from a polymeric material is useful for draining water, other than sewage from motor homes, RV's, campers and the like while maintaining required sanitation. The adaptor is placed in the sewer receptacle stub to prevent odor and bacteria escapage. The adaptor can also be coupled to a conventional sewer hose for sanitary fresh water rinsing of the sewer hose by utilizing the water hose connector positioned atop the adaptor.

7 Claims, 3 Drawing Sheets

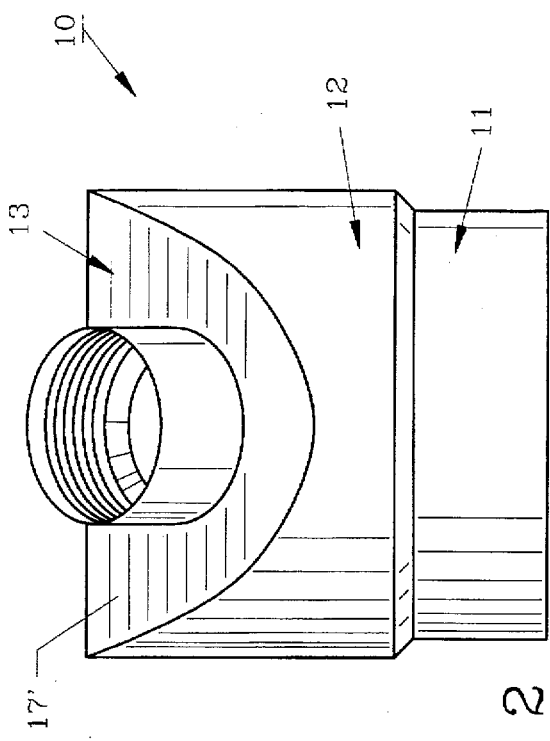
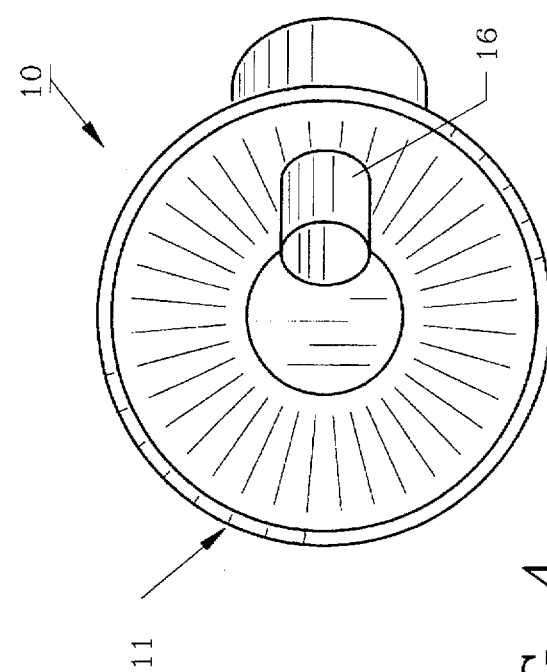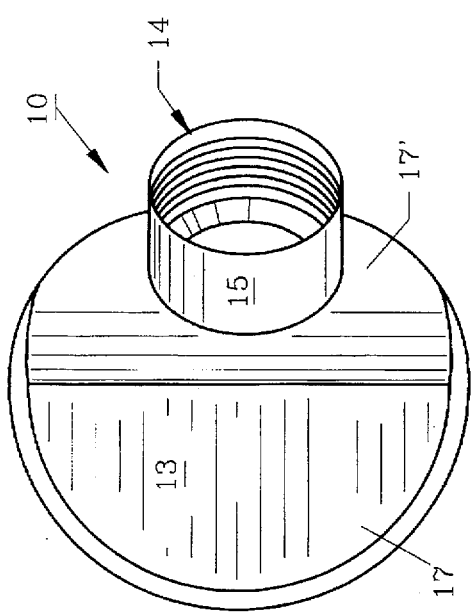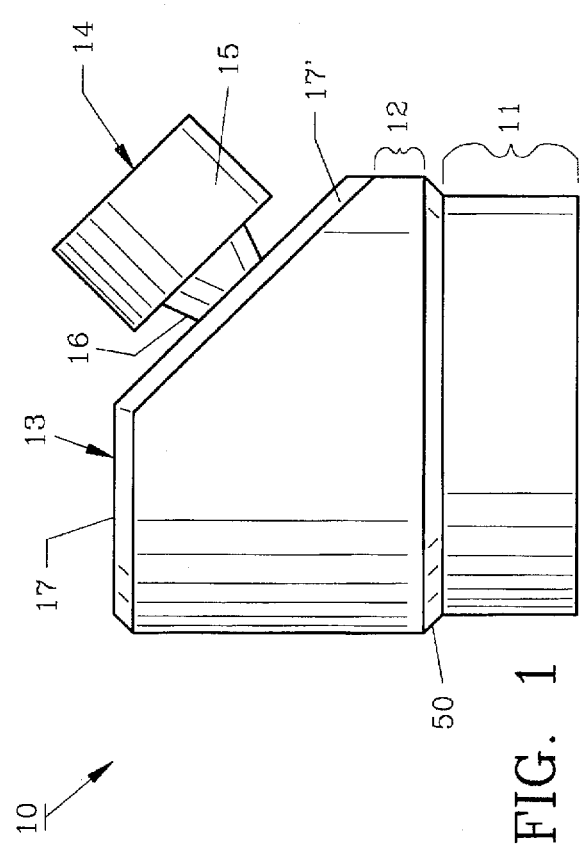

GRAY WATER LINE ADAPTOR

BACKGROUND OF THE INVENTION

1. Field of the Invention

The invention herein pertains to sewer piping and fittings for recreational vehicles, motor homes, campers, and the like and particularly pertains to fittings for gray water discharge.

2. Description of the Prior Art and Objectives of the Invention

With the increase in recreational vehicles, motor homes and related vehicles in recent years, increased attention has been directed to the health and sanitation needs of motor home and other recreational vehicle campers. Particular attention has been paid to the discharge of "black water" (sewage), but little attention has been paid to the drainage of sink water, showers, lavatories and other "gray water" sources. As understood, gray water does not usually contain the bacteria types and amounts of black water and can be handled somewhat differently. However, oftentimes at "Dry" rallies, sewer connections are not made, but gray water connections may be necessary. At other times, RV owners have the need of connecting a gray water line to a sewage line and must insure that the connection is properly sealed to prevent residual sewage and bacteria escape.

Thus, with the varying requirements of RV owners and the problems associated with gray water discharges, the present invention was conceived and one of its objectives is to provide an adaptor for use with gray water drainage which is relatively inexpensive to purchase and which is simple to use.

It is another objective of the present invention to provide a gray water line adaptor which can be used in a variety of applications such as in the discharge of gray water from an RV or in cleaning sewer lines with fresh water before disconnection from the septic system and storage of the sewage line.

It is still another objective of the present invention to provide a gray water line adaptor which has a plurality of cylindrical sections for various size connections.

It is also an objective of the present invention to provide a gray water line adaptor which includes a standard utility water hose fitting.

Various other advantages and benefits of the present invention will become apparent to those skilled in the art as a more detailed description is set forth below.

SUMMARY OF THE INVENTION

A gray water line adaptor is formed from a suitable polymeric material and includes a large opening at one end for slidable connection with a sewer connector. The opposite end is closed except for a conventional utility water hose fitting attached thereto. The water hose fitting is on a bias for ease and convenience in use and provides a method for discharging gray water from an RV or the like without the necessity of making a conventional sewage line hookup. The gray water line adaptor has a plurality of outside diameters for different connections as are encountered among standard RV hoses and fittings.

BRIEF DESCRIPTION OF THE DRAWINGS

FIG. 1 shows a side view of the preferred gray water line adaptor of the invention;

FIG. 2 demonstrates a front elevational view of the gray water line adaptor as seen in FIG. 1;

FIG. 3 depicts a top view of the gray water line adaptor;

FIG. 4 pictures a bottom view of the adaptor as shown in FIG. 1;

DETAILED DESCRIPTION OF THE PREFERRED EMBODIMENT AND OPERATION OF THE INVENTION

Figure 7:
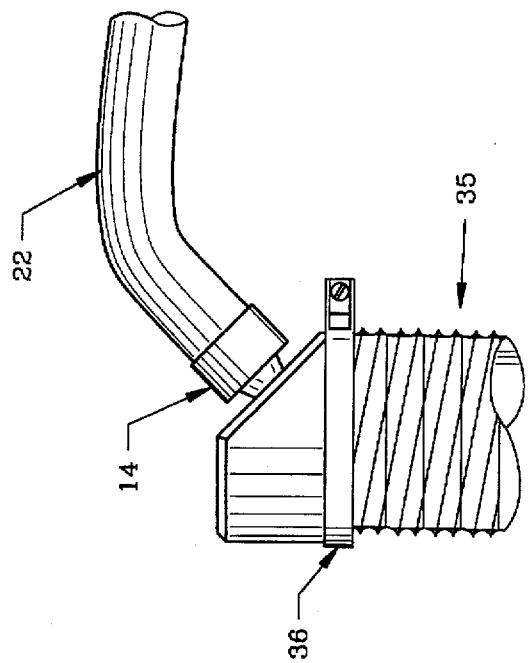
FIG. 7 features the adaptor used in rinsing a conventional flexible sewer hose.

For a better understanding of the invention and its operation, turning now to the drawings, the preferred form of gray water line adaptor 10 is shown in FIGS. 1–7. As shown in FIG. 1, gray water line adaptor 10 includes a first cylindrical section 11 having an outside diameter of approximately 72 millimeters and an inside diameter of approximately 67 millimeters for coupling with conventional RV sewer line fittings. Immediately above and connected in fluid communication with first cylindrical section 11 is cylindrical section 12, which has a larger outer diameter of approximately 76 millimeters with the inside diameter of cylindrical section 11 and 12 being the same. The water hose adaptor end or top 13 is closed as shown in FIG. 3, except for the opening in hose fitting 14 joined thereto. Fitting 14 may accommodate a conventional ¾ inch or ⅝ inch utility water hose as desired. Hose fitting 14 is sized to receive the threaded male end of a conventional garden or utility hose an includes internal threads therefor. As with such standard fittings, cap 15 will rotate on stem 16 for connection and disconnection purposes of the water hose.

In FIGS. 1 and 2, top 13 has a substantially flat component 17 and biased component 17'. Flat component 17 and biased component 17' extend approximately halfway across the diameter of second cylindrical section 12 as shown therein. Biased component 17' is positioned at an approximate 45° angle to flat portion 17 to provide proper fluid passage into adaptor 10 from a utility hose or the like or from adaptor 10 as needed.

Figure 5:
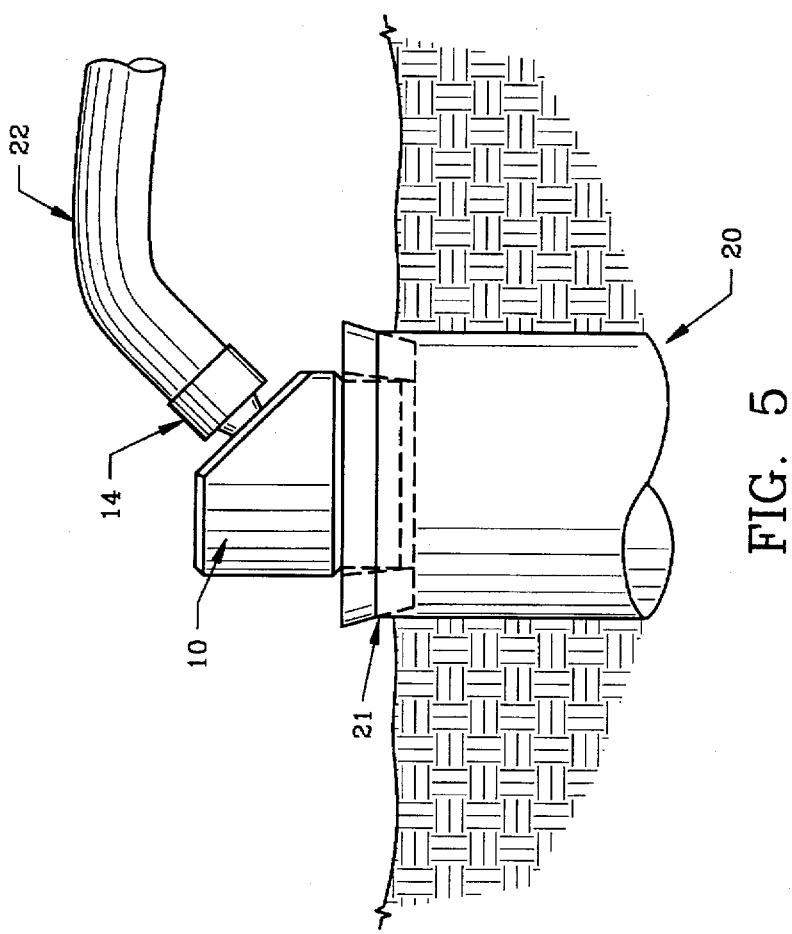
FIG. 5 illustrates the adaptor of FIG. 1 joined with a rubber seal to a sewer receptacle stub.

In FIG. 4, gray water line adaptor 10 is shown from a bottom view with stem 16 projecting approximately 20 millimeters therein. Gray water line adaptor 10 can be used advantageously in a variety of ways. Second cylindrical section 12 forms a shoulder 50 with first cylindrical section 11 as shown in FIG. 5, which shoulder 50 provides an abutment surface against which receptacle stub 20 may seal against seal 21. For example, in FIG. 5 adaptor 10 is positioned in sewer receptacle stub 20 as may be available at an RV campground, park, or the like. As shown, sewer seal 21, which is a conventional conically shaped collar formed of rubber or the like, is positioned in sewer receptacle stub 20 and adaptor 10 is manually urged therein and utility hose 22 is threadably joined to hose fitting 14. The female end of utility hose 22 (not shown) is then connected to a conventional connector at the RV, camper, or the like and dishwater, bathwater, and other gray water can then be drained through utility hose 22, through sewer receptacle stub 20 and into the septic tank or other sewage treatment facility (not seen) as may be employed. Gray water adaptor 20 used as illustrated prevents noxious fumes from escaping during gray water drainage and provides a more sanitary camping site.

Figure 6:
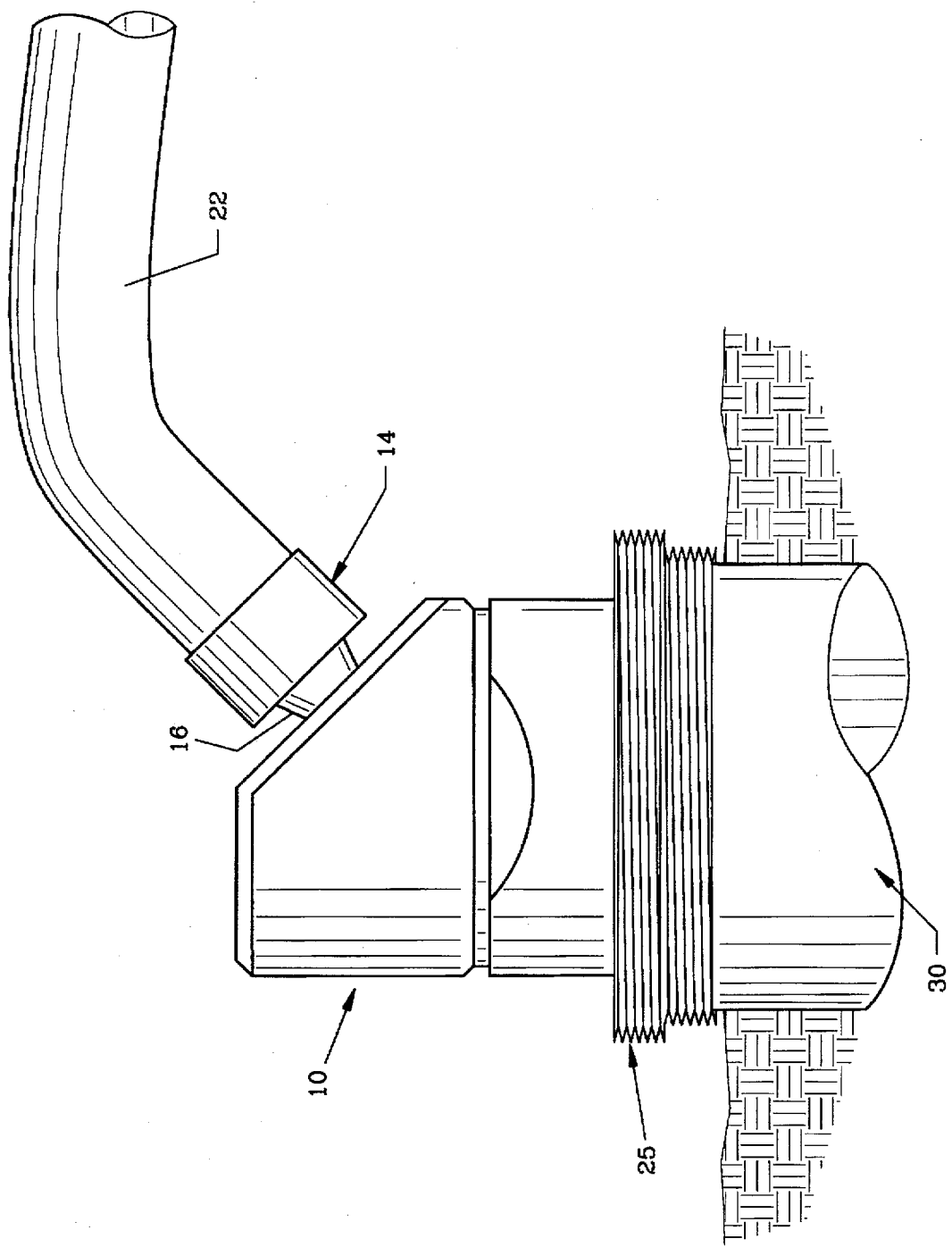
FIG. 6 shows the gray water line adaptor as seen in FIG. 1 connected to a threaded sewer connector in a threaded sewer receptacle stub.

In another use of adaptor 10, pictured in FIG. 6, gray water drainage is accomplished through a conventional threaded adaptor 25 positioned in (internally) threaded sewer receptacle stub 30. The slidable fit of gray water line adaptor 10 into threaded sewer adaptor 25 likewise provides an odor-free joint and allows gray water to be drained from the RV or camper without the necessity of connecting a conventional, flexible sewer hose.

Another use of gray water line adaptor 10 is demonstrated in FIG. 7. Conventional flexible sewer hose 35 which is joined at its distal end (not shown) to a sewer receptacle stub can be easily cleaned before disconnecting and storage. As seen, sewer hose 35 can be disconnected at its proximal end 36 and urged onto adaptor 10, specifically around second cylindrical section 12 for a leakproof connection. Next, fresh water is directed through utility hose 22 whereupon sewer hose 35 is cleaned in a healthy, sanitary manner and the rinse water passes out of sewer hose 35 into the sewer hose receptacle stub (not shown).

Various other uses and modifications can be made to gray water line adaptor 10 as shown herein by those skilled in the art and the examples and drawings are for explanatory purposes only and are not intended to limit the scope of the appended claims.

I claim:

1. A gray water line adaptor for fluid connection to a water hose and to a sewer stub, said adaptor comprising: a first cylindrical section, said first cylindrical section for engagement with said sewer stub, a second cylindrical section, said second cylindrical section joined to said first cylindrical section, each section having a central axis, a water hose fitting, said water hose fitting attached to said second cylindrical section for draining gray water, said water hose fitting for connection to said water hose, said first cylindrical section having a diameter less than the diameter of said second cylindrical section, said second cylindrical section having a proximal and a distal end, said proximal end attached to said first cylindrical section, and a top, said top attached to said distal end to close said second cylindrical section, said top comprising a biased component, said biased component angularly disposed relative to the central axis of said second cylindrical section, said hose fitting attached to said biased component.

2. The adaptor of claim 1 wherein said second cylindrical section and said first cylindrical section form a shoulder therebetween, said shoulder for sealing engagement with a seal intermediate said shoulder the top of said sewer stub.

3. The adaptor of claim 1 wherein said hose fitting is threaded.

4. A line adaptor useful for draining gray water from a motor home, in combination with a water hose and a cylindrical sewer stub, said line adaptor comprising: a first cylindrical section, said first cylindrical section for insertion into said sewer stub, a second cylindrical section, said second cylindrical section attached to said first cylindrical section and in fluid communication therewith, said second cylindrical section having a diameter greater than the diameter of said first cylindrical section to form a shoulder therebetween, said shoulder for sealing engagement with a seal intermediate said shoulder and said sewer stub, a top, said top closing one end of said second cylindrical section, said top comprising a flat component and a biased component, said biased component angularly disposed relative to said flat component, a hose fitting, said hose fitting attached to said biased component to drain the gray water and in fluid communication therewith, said hose fitting for connection to said water hose.

5. The adaptor of claim 4 wherein said biased component is positioned at an approximate 45° angle.

6. The adaptor of claim 4 molded from a plastic material.

7. An adaptor for rinsing a sewer hose with fresh water from a supply hose, said adaptor comprising:

(a) a first cylindrical section, said first cylindrical section for connection to a the sewer hose;

(b) a second cylindrical section, said second cylindrical section coaxially joined to said first cylindrical section, each section having a central axis said second cylindrical section having a diameter greater than the diameter of said first cylindrical section and forming a shoulder therebetween, said shoulder for abutment with said sewer hose, said second cylindrical section comprising a proximal end, a distal end, and a top, said proximal end attached to said first cylindrical section, said top joined to said distal end to close the same, said top comprising a flat component and a biased component, said biased component angularly positioned relative to said flat component; and (c) a hose fitting, said hose fitting engaged with said biased component, said hose fitting for connection to said supply hose, said hose fitting being in fluid communication with said second cylindrical section and being angularly disposed relative to the axis of said first and said second cylindrical sections;

whereby water from the supply hose will pass through the hose fitting, striking the walls of the sewer hose for rinsing the sewer hose.

* * * * *